(12) United States Patent
Dods et al.

(10) Patent No.: US 11,741,216 B1
(45) Date of Patent: Aug. 29, 2023

(54) CREDENTIAL REVOCATION LEVERAGING PRIVATE KEYS ON KEYSTORES READ BY PROVISIONED DEVICES

(71) Applicant: LedgerDomain Inc., Las Vegas, NV (US)

(72) Inventors: Victor Bovee Dods, Seattle, WA (US); Benjamin James Taylor, Las Vegas, NV (US); Benjamin Gregory Nichols, New Plymouth (NZ)

(73) Assignee: LedgerDomain Inc., Las Vegas, NV (US)

( * ) Notice: Subject to any disclaimer, the term of this patent is extended or adjusted under 35 U.S.C. 154(b) by 0 days.

(21) Appl. No.: 17/982,513

(22) Filed: Nov. 7, 2022

(51) Int. Cl.
G06F 21/00 (2013.01)
G06F 21/45 (2013.01)
H04L 9/30 (2006.01)

(52) U.S. Cl.
CPC ............... *G06F 21/45* (2013.01); *H04L 9/30* (2013.01)

(58) Field of Classification Search
CPC .................................. G06F 21/45; H04L 9/30
See application file for complete search history.

(56) References Cited

U.S. PATENT DOCUMENTS

| | | | |
|---|---|---|---|
| 7,170,391 B2* | 1/2007 | Lane | G07F 7/08 340/10.5 |
| 9,870,508 B1 | 1/2018 | Hodgson et al. | |
| 10,268,974 B2 | 4/2019 | Wiig et al. | |
| 10,491,404 B1 | 11/2019 | Yamamoto | |
| 10,491,578 B1 | 11/2019 | Hebert et al. | |
| 10,496,802 B2 | 12/2019 | Weis | |
| 10,509,684 B2 | 12/2019 | Florissi et al. | |
| 10,516,525 B2 | 12/2019 | Bhattacharya et al. | |
| 10,540,704 B2 | 1/2020 | Mazed et al. | |
| 10,542,046 B2 | 1/2020 | Katragadda et al. | |
| 10,990,693 B1 | 4/2021 | Newman | |
| 11,468,046 B2 | 10/2022 | Conley et al. | |

(Continued)

FOREIGN PATENT DOCUMENTS

| | | |
|---|---|---|
| CN | 110597902 A | 12/2019 |
| WO | 2018206408 A1 | 11/2018 |

(Continued)

OTHER PUBLICATIONS

Looker et. al., BBS+ Signatures 2020 Draft Community Group Report, W3C Community Group, dated Jun. 13, 2021, 31 pages. Retrieved on Oct. 3, 2021. Retrieved from the internet [URL: https://w3c-ccg.github.io/ldp-bbs2020/ ].

(Continued)

*Primary Examiner* — Ghazal B Shehni
(74) *Attorney, Agent, or Firm* — Haynes Beffel & Wolfeld LLP; Andrew L. Dunlap; Paul A. Durdik

(57) ABSTRACT

The disclosed technology teaches a method for revocation of user credentials for controlling user access to a private permissioned blockchain data structure or decentralized personal ledger, comprising an administrative logic configured to de-configure user private keys from keystores of respective users. The administrative logic further comprises a revocation logic configured to receive a unique identifier linked to a keystore of a particular user in response to the keystore, and the revocation logic is further configured to revoke access of the keystore based on the unique identifier.

26 Claims, 11 Drawing Sheets

(56) References Cited

U.S. PATENT DOCUMENTS

| | | | |
|---|---|---|---|
| 11,509,709 B1 | 11/2022 | Basak et al. | |
| 2012/0130905 A1* | 5/2012 | Tsudik | G06Q 20/401 |
| | | | 713/168 |
| 2014/0006048 A1 | 1/2014 | Liberty | |
| 2014/0025443 A1 | 1/2014 | Onischuk | |
| 2015/0262171 A1 | 9/2015 | Langschaedel et al. | |
| 2015/0269379 A1 | 9/2015 | Ramzan et al. | |
| 2016/0125199 A1 | 5/2016 | Lee et al. | |
| 2016/0155069 A1 | 6/2016 | Hoover et al. | |
| 2016/0212146 A1 | 7/2016 | Wilson | |
| 2017/0103167 A1 | 4/2017 | Shah | |
| 2017/0221032 A1 | 8/2017 | Mazed | |
| 2017/0286880 A1 | 10/2017 | Wiig et al. | |
| 2017/0310653 A1 | 10/2017 | Zhang | |
| 2018/0114169 A1 | 4/2018 | Wiig et al. | |
| 2018/0139186 A1 | 5/2018 | Castagna | |
| 2019/0012249 A1 | 1/2019 | Mercuri et al. | |
| 2019/0020661 A1 | 1/2019 | Zhang | |
| 2019/0026450 A1 | 1/2019 | Egner et al. | |
| 2019/0051079 A1 | 2/2019 | Venkataraman et al. | |
| 2019/0057386 A1 | 2/2019 | Fazeli et al. | |
| 2019/0058599 A1 | 2/2019 | Takada Chino et al. | |
| 2019/0068562 A1* | 2/2019 | Iyer | H04L 9/0637 |
| 2019/0075102 A1 | 3/2019 | Kim et al. | |
| 2019/0108898 A1 | 4/2019 | Gulati | |
| 2019/0138905 A1 | 5/2019 | Akella et al. | |
| 2019/0138971 A1 | 5/2019 | Uggirala et al. | |
| 2019/0171438 A1 | 6/2019 | Franchitti | |
| 2019/0180276 A1* | 6/2019 | Lee | H04L 9/3247 |
| 2019/0228174 A1 | 7/2019 | Withrow et al. | |
| 2019/0251295 A1 | 8/2019 | Vieyra | |
| 2019/0281066 A1 | 9/2019 | Simons | |
| 2019/0325507 A1 | 10/2019 | Rowley et al. | |
| 2019/0333116 A1 | 10/2019 | Bhardwaj et al. | |
| 2019/0334716 A1 | 10/2019 | Kocsis et al. | |
| 2019/0392162 A1 | 12/2019 | Stern et al. | |
| 2020/0005133 A1 | 1/2020 | Zhang et al. | |
| 2020/0013229 A1 | 1/2020 | Lee et al. | |
| 2020/0019288 A1 | 1/2020 | D'Amore et al. | |
| 2020/0084483 A1 | 3/2020 | Brown et al. | |
| 2020/0110821 A1 | 4/2020 | Chan et al. | |
| 2020/0118060 A1 | 4/2020 | Mukherjee et al. | |
| 2020/0153606 A1 | 5/2020 | Li et al. | |
| 2020/0186358 A1 | 6/2020 | Capola et al. | |
| 2020/0252205 A1 | 8/2020 | Padmanabhan | |
| 2020/0258166 A1 | 8/2020 | Cross et al. | |
| 2020/0268260 A1 | 8/2020 | Tran | |
| 2020/0294033 A1 | 9/2020 | Wilson et al. | |
| 2020/0320207 A1* | 10/2020 | Beno | G06F 21/64 |
| 2020/0322169 A1 | 10/2020 | Michaud et al. | |
| 2020/0374137 A1 | 11/2020 | Godfrey | |
| 2020/0403809 A1 | 12/2020 | Chan et al. | |
| 2021/0034779 A1 | 2/2021 | Signorini et al. | |
| 2021/0126797 A1 | 4/2021 | Peng | |
| 2021/0136068 A1 | 5/2021 | Smeets et al. | |
| 2021/0150205 A1 | 5/2021 | Snyder et al. | |
| 2021/0174914 A1 | 6/2021 | Cano et al. | |
| 2021/0182539 A1 | 6/2021 | Rassool | |
| 2021/0208960 A1 | 7/2021 | Dande et al. | |
| 2021/0218720 A1 | 7/2021 | Oberhauser et al. | |
| 2021/0234672 A1 | 7/2021 | Zeng et al. | |
| 2021/0264520 A1 | 8/2021 | Cummings | |
| 2022/0051240 A1 | 2/2022 | Shamai et al. | |
| 2022/0051314 A1 | 2/2022 | Enkhtaivan | |
| 2022/0052988 A1 | 2/2022 | Gadnis et al. | |
| 2022/0083936 A1 | 3/2022 | Balinsky et al. | |
| 2022/0150077 A1 | 5/2022 | Kim | |
| 2022/0179378 A1 | 6/2022 | Gourisetti et al. | |
| 2022/0405750 A1 | 12/2022 | Fallah et al. | |
| 2022/0407856 A1 | 12/2022 | Jawed | |
| 2022/0417331 A1 | 12/2022 | Devine et al. | |
| 2023/0006845 A1 | 1/2023 | Leedom, Jr. | |

FOREIGN PATENT DOCUMENTS

| | | |
|---|---|---|
| WO | 2019086553 A1 | 5/2019 |
| WO | 2019090264 A1 | 5/2019 |
| WO | 2019090268 A1 | 5/2019 |
| WO | 2019207297 A1 | 10/2019 |
| WO | 2020006121 A1 | 1/2020 |
| WO | 2021127577 A1 | 6/2021 |

OTHER PUBLICATIONS

Hyperledger, Ursa, Github, updated 2021, 7 pages. Retrieved on Oct. 3, 2021. Retrieved from the internet [URL: https://github.com/hyperledger/ursa ].

Partnership for DSCSA Governance, PDG, 2021, 3 pages. Retrieved on Oct. 3, 2021. Retrieved from the internet [URL: https://dscsagovernance.org/ ].

Housley et. al., Trust Anchor Format, Internet Engineering Task Force (IETF), dated Jun. 2021, 14 pages. Retrieved on Oct. 3, 2021. Retrieved from the internet [URL: https://datatracker.ietf.org/doc/html/rfc5914 ].

Thayer, "Why Does Mozilla Maintain Our Own Root Certificate Store?", Mozilla Security Blog, dated Feb. 14, 2019, 3 pages. Retrieved on Oct. 3, 2021. Retrieved from the internet [URL: https://blog.mozilla.org/security/2019/02/14/why-does-mozilla-maintain-our-own-root-certificate-store/ ].

Otto et. al., Verifiable Credentials Use Cases, W3C Working Group, dated Sep. 24, 2019, 35 pages. Retrieved on Oct. 3, 2021. Retrieved from the internet [URL: https://www.w3.org/TR/vc-use-cases/ ].

Entities, Spherity, 3 pages. Retrieved on Oct. 3, 2021. Retrieved from the internet [URL: https://docs.spherity.com/spherity-api/verifiable-credentials-api/entities ].

General Meeting Agenda—Healthcare SIG, Hyperledger Foundation, updated Feb. 17, 2021, 2 pages. Retrieved on Oct. 3, 2021. Retrieved from the internet [URL: https://wiki.hyperledger.org/display/HCSIG/2021.02.17+General+Meeting+Agenda ].

Google Protocol Buffers—Google's data interchange format, Github, dated 2008, 6 pages. Retrieved on Oct. 3, 2021. Retrieved from the internet [URL: https://github.com/protocolbuffers/protobuf ].

Young, Verifiable Credentials Flavors Explained, Covid-19 Credentials Initiative, dated Feb. 2021, 21 pages. Retrieved on Oct. 3, 2021. Retrieved from the internet [URL: https://www.lfph.io/wp-content/uploads/2021/02/Verifiable-Credentials-Flavors-Explained.pdf ].

Dodds, Follow Your Nose, Linked Data Patterns, dated May 31, 2012, 2 pages. Retrieved on Oct. 3, 2021. Retrieved from the internet [URL: https://patterns.dataincubator.org/book/follow-your-nose.html ].

Searls, New Hope for Digital Identity, Linux Journal, dated Nov. 9, 2017, 7 pages. Retrieved on Oct. 4, 2021. Retrieved from the internet [URL: https://www.linuxjournal.com/content/new-hope-digital-identity ].

Temoshok et. al., Developing Trust Frameworks to Support Identity Federations, National Institute of Standards and Technology (NIST), dated Jan. 2018, 34 pages. Retrieved on Oct. 4, 2021. Retrieved from the internet [URL: http://dx.doi.org/10.6028/NIST.IR.8149 ].

Makaay et. al., Frameworks for Identity Systems, Open Identity Exchange (OIX), dated Jun. 2017, 18 pages. Retrieved on Oct. 5, 2021. Retrieved from the internet [URL: https://connectis.com/wp-content/uploads/2018/05/OIX-White-Paper_Trust-Frameworks-for-Identity-Systems_Final.pdf ].

Web Assembly, Mozilla Developer Network (MDN), dated 2021, 31 pages. Retrieved on Oct. 5, 2021. Retrieved from the internet [URL: https://developer.mozilla.org/en-US/docs/WebAssembly ].

Rossberg, WebAssembly Core Specification, W3C Working Group, W3C, dated Dec. 5, 2019, 164 pages. Retrieved on Oct. 5, 2021. Retrieved from the internet [URL: https://www.w3.org/TR/wasm-core-1/ ].

Kaptjin et. al., X.509 DID method, WebOfTrustInfo, GitHub, dated Aug. 12, 2019, 6 pages. Retrieved on Oct. 5, 2021. Retrieved from the internet [URL: https://github.com/WebOfTrustInfo/rwot9-prague/blob/master/topics-and-advance-readings/X.509-DID-Method.md ].

(56) References Cited

OTHER PUBLICATIONS

Sovrin Governance Framework Working Group, Sovrin Governance Framework V2, Sovrin Foundation, dated Dec. 4, 2019, 20 pages. Retrieved on Oct. 5, 2021. Retrieved from the internet [URL: https://sovrin.org/wp-content/uploads/Sovrin-Governance-Framework-V2-Master-Document-V2.pdf ].
Callahan et. al., Six Principles for Self-Sovereign Biometrics, Web of Trust Info., GitHub, dated Oct. 6, 2019,7 pages. Retrieved on Oct. 5, 2021. Retrieved from the internet [URL: https://github.com/WebOfTrustInfo/rwot6-santabarbara/blob/master/draft-documents/Biometrics.md].
Rose et. al., Zero Trust Architecture, NIST Special Publication 800-207, dated Aug. 2020, 59 pages. Retrieved on Oct. 6, 2021. Retrieved from the internet [URL: https://csrc.nist.gov/publications/detail/sp/800-207/final ].
Identity-concept.svg, Wikimedia Commons, 3 pages. Retrieved on Oct. 6, 2021. Retrieved from the internet [URL: https://commons.wikimedia.org/wiki/File:Identity-concept.svg ].
Hardman, Verifiable Data Registry (Image), Wikipedia, dated Nov. 5, 2019, 1 page. Retrieved on Oct. 6, 2021. Retrieved from the internet [URL: https://en.wikipedia.org/wiki/Verifiable_credentials#/media/File:VC_triangle_of_Trust.svg ].
Bogdanov, Pseudorandom Functions: Three Decades Later, dated 2017, 72 pages. Retrieved on Oct. 6, 2021. Retrieved from the internet [URL: https://eprint.iacr.org/2017/652.pdf ].
Grassi et. al., Digital Identity Guidelines, NIST Special Publication 800-63-3, dated Jun. 2017, 75 pages. Retrieved on Oct. 6, 2021. Retrieved from the internet [URL: https://doi.org/10.6028/NIST.SP.800-63-3 ].
Grassi et. al., Digital Identity Guidelines: Authentication and Lifecycle Management, NIST Special Publication 800-63B, dated Jun. 2017, 79 pages. Retrieved on Oct. 6, 2021. Retrieved from the internet [URL: https://doi.org/10.6028/NIST.SP.800-63b ].
Grassi et. al., Digital Identity Guidelines: Federation and Assertions, NIST Special Publication 800-63C, dated Jun. 2017, 49 pages. Retrieved on Oct. 6, 2021. Retrieved from the internet [URL: https://doi.org/10.6028/NIST.SP.800-63c ].
Untitled code sample, W3C Working Group, W3C, dated 2018, 7 pages. Retrieved on Oct. 6, 2021. Retrieved from the internet [URL: https://www.w3.org/2018/credentials/v1 ].
DIF—Decentralized Identity Foundation, Homepage, dated 2021, 8 pages. Retrieved on Oct. 6, 2021. Retrieved from the internet [URL: https://identity.foundation/ ].
PharmaCompass, Top 1000 Global Pharmaceutical Companies, LePro PharmaCompass OPC, dated Sep. 2020, 101 pages. Retrieved on Oct. 6, 2021. Retrieved from the internet [URL: https://www.pharmacompass.com/data-compilation/top-1000-global-pharmaceutical-companies ].
How to share an OpenPGP public key easily in three steps, Mailfence, dated Jul. 11, 2017, 14 pages. Retrieved on Aug. 13, 2021. Retrieved from the internet [URL: https://blog.mailfence.com/openpgp-public-key/ ].
U.S. Appl. No. 17/492,488—Office Action dated Aug. 17, 2022, 25 pages.
Abid et al., Block-Chain Security Advancement in Medical Sector for sharing Medical Records, 2019 International Conference on Innovative Computing (ICIC) (Year: 2019).
Rahman et al., Blockchain Based Mobile Edge Computing Framework for Secure Therapy Applications, 2018, IEEE Special Section on Mobile Multimedia for Healthcare, vol. 6, pp. 72469-72478 (Year: 2018).
Grassi et. al., NIST Special Publication 800-63C, Digital Identity Guidelines—Federation and Assertions, retrieved on Oct. 1, 2021, 48 pages. Retrieved from [ URL: https://pages.nist.gov/800-63-3/sp800-63c.html ].
Drug Supply Chain Security Act (DSCSA), Food and Drug Administration (FDA), retrieved on Oct. 1, 2021, 3 pages. Retrieved from [URL: https://www.fda.gov/drugs/drug-supply-chain-integrity/drug-supply-chain-security-act-dscsa ].
Callahan, Council Post: Know Your Customer (KYC) Will Be a Great Thing When It Works, Forbes, dated Jul. 10, 2018, 8 pages. Retrieved on Oct. 1, 2021. Retrieved from [URL: https://www.forbes.com/sites/forbestechcouncil/2018/07/10/know-your-customer-kyc-will-be-a-great-thing-when-it-works/?sh=722a21178dbb ].
U.S. Department of Health and Human Services Food and Drug Administration, Identifying Trading Partners Under the Drug Supply Chain Security Act: Guidance for Industry—Draft Guidance, Aug. 2017, 18 pages. Retrieved on Oct. 1, 2021. Retrieved from the internet [URL: https://www.fda.gov/files/drugs/published/Identifying-Trading-Partners-Under-the-Drug-Supply-Chain-Security-Act-Guidance-for-Industry.pdf ].
U.S. Food and Drug Administration, Drug Supply Chain Security Act Law and Policies, U.S. Department of Health and Human Services Food and Drug Administration, updated Oct. 23, 2020, 6 pages. Retrieved on Oct. 1, 2021. Retrieved from the internet [URL: https://www.fda.gov/drugs/drug-supply-chain-security-act-dscsa/drug-supply-chain-security-act-law-and-policies].
Freisleben, VRS Updates: Past, Present and Future, dated Dec. 12, 2018, Healthcare Distribution Alliance (HDA), 6 pages. Retrieved on Oct. 1, 2021. Retrieved from the internet [URL: https://www.hda.org/news/hda-blog/2018/12/07/14/44/2018-12-12-vrs-update-past-present-future ].
GS1 Healthcare U.S. Standard 1.1—Applying the GS1 Lightweight Messaging Standard for DSCSA Verification of Returned Product Identifiers, dated Mar. 31, 2020, 60 pages. Retrieved on Oct. 1, 2021. Retrieved from the Internet [URL: https://www.gs1us.org/DesktopModules/Bring2mind/DMX/Download.aspx?Command=Core_Download&EntryId=1897&language=en-US&PortalId=0&TabId=134 ].
Jurgens, Industry-wide DSCSA Compliance Pilot Successfully Completed, Spherity, dated Dec. 17, 2020, 15 pages. Retrieved on Oct. 1, 2021. Retrieved from the internet [URL: https://medium.com/spherity/industry-wide-dscsa-compliance-pilot-successfully-completed-d7223a0f2c92 ].
XATP Working Group, Framework for extended ATP Authentication, Enhanced Verification and Saleable Returns Documentation, LedgerDomain, dated Dec. 17, 2020, 25 pages. Retrieved on Oct. 1, 2021. Retrieved from the internet [URL: https://www.xatp.org/publications ].
Chadwick et. al., Verifiable Credentials Data Model 1.0: Expressing verifiable information on the Web, World Wide Web Consortium (W3C), dated Nov. 19, 2019, 68 pages. Retrieved on Oct. 1, 2021. Retrieved from the internet [URL: https://www.w3.org/TR/vc-data-model/ ].
GS1 Healthcare U.S., Assessing Current Implementation of DSCSA Serialization Requirements, GS1 US, dated 2018, 6 pages. Retrieved on Oct. 2, 2021. Retrieved from the internet [URL: https://www.gs1us.org/DesktopModules/Bring2mind/DMX/Download.aspx?Command=Core_Download&EntryId=1210&language=en-US&PortalId=0&TabId=134 ].
GS1 U.S., DSCSA Pilot Project readiness results, PDG FDA Pilot Program Round-Robin Webinar Series, dated Jun. 30, 2020, slides 16-29. Retrieved on Oct. 2, 2021. Retrieved from the internet [URL: : https://dscsagovernance.org/wp-content/uploads/2020/08/Attachment-A-Presentations.pdf ].
U.S. Department of Health and Human Services Food and Drug Administration, Verification Systems Under the Frug Supply Chain Security Act for Certain Prescription Drugs, Guidance for Industry, Draft Guidance, dated Oct. 2018, 14 pages. Retrieved on Oct. 2, 2021. Retrieved from the internet [URL: https://www.fda.gov/media/117950/download ].
GS1 Healthcare U.S., Standard 1.2, Applying GS1 Standards for DSCSA and Traceability, dated Nov. 7, 2016, 126 pages. Retreived on Oct. 2, 2021. Retrieved from the internet [URL: https://www.gs1us.org/DesktopModules/Bring2mind/DMX/Download.aspx?Command=Core_Download&EntryId=749&language=en-US&PortalId=0&TabId=134 ].
GS1 Healthcare U.S., GS1 Lightweight Messaging Standard for Verification of Product Identifiers, dated Dec. 2018, 30 pages. Retrieved on Oct. 2, 2021. Retrieved from the internet [URL: https://www.gs1.org/docs/epc/GS1_Lightweight_Verification_Messaging_Standard.pdf ].

(56) References Cited

OTHER PUBLICATIONS

U.S. Department of Health and Human Services Food and Drug Administration, Wholesale Distributor Verification Requirement for Saleable Returned Drug Product and Dispenser Verification Requirements When Investigating a Suspect or Illegitimate Product—Compliance Policies, Guidance for Industry, dated Oct. 2020, 10 pages. Retrieved on Oct. 2, 2021. Retrieved from the internet [URL: https://www.fda.gov/media/131005/download ].

DSCSA Pilot Project Program, Food and Drug Administration (FDA), updated May 22, 2019, 4 pages. Retrieved on Oct. 2, 2021. Retrieved from the internet [URL: https://www.fda.gov/drugs/drug-supply-chain-security-act-dscsa/dscsa-pilot-project-program ].

Chien et. al., The Last Mile: DSCSA Solution Through Blockchain Technology: Drug Tracking, Tracing and Verification at the Last Mile of the Pharmaceutical Supply Chain with BRUINchain, Blockchain in Healthcare Today, dated Mar. 12, 2020, 28 pages. Retrieved on Oct. 2, 2021. Retrieved from the internet [URL: https://blockchainhealthcaretoday.com/index.php/journal/article/view/134 ].

Androulaki et. al., Hyperledger Fabric: A distributed operating system for permissioned blockchains, Proceedings for EuroSys 2018 Conference, revised Apr. 17, 2018, 15 pages. Retrieved on Oct. 2, 2021. Retrieved from the internet [URL: https://arxiv.org/abs/1801.10228 ].

Gabay, Federal Controlled Substances Act: Ordering and Recordkeeping, Hospital Pharmacy, dated Dec. 9, 2013, 3 pages. Retrieved on Oct. 2, 2021. Retrieved from the internet [URL: https://www.ncbi.nlm.nih.gov/pmc/articles/PMC3875106/ ].

Federal Trade Commission, Federal Law Requires All Businesses to Truncate Credit Card Information on Receipts, Federal Trade Commission (FTC), dated May 2007, 3 pages. Retrieved on Oct. 2, 2021. Retrieved from the internet [URL: https://www.ftc.gov/tips-advice/business-center/guidance/slip-showing-federal-law-requires-all-businesses-truncate ].

Matney, Apple's global active install base of iPhones surpassed 900 million this quarter, TechCrunch, dated Jan. 29, 2019, 2 pages. Retrieved on Oct. 2, 2021. Retrieved from the internet [URL: https://techcrunch.com/2019/01/29/apples-global-active-install-base-of-iphones-surpassed-900-million-this-quarter/ ].

Shuaib et. al., Blockchains for Secure Digitized Medicine, Journal of Personalized Medicine, dated Jul. 13, 2019, 9(3): 35, 21 pages. Retrieved on Oct. 2, 2021. Retrieved from the internet [URL: https://www.mdpi.com/2075-4426/9/3/35 ].

Brook, "What's the Cost of a Data Breach in 2019?", Data Insider—Digital Guardian, dated Dec. 1, 2020, 8 pages. Retrieved on Oct. 2, 2021. Retrieved from the internet [URL: https://digitalguardian.com/blog/whats-cost-data-breach-2019 ].

Keen et. al., Forecasts Worldwide Information Security Spending to Exceed $124 Billion in 2019, Gartner, dated Aug. 15, 2018, 5 pages. Retrieved on Oct. 2, 2021. Retrieved from the internet [URL: https://www.gartner.com/en/newsroom/press-releases/2018-08-15-gartner-forecasts-worldwide-information-security-spending-to-exceed-124-billion-in-2019 ].

Ponemon, What's New in the 2019 Cost of a Data Breach Report, Security Intelligence, dated Jul. 23, 2019, 10 pages. Retrieved on Oct. 2, 2021. Retrieved from the internet [URL: https://securityintelligence.com/posts/whats-new-in-the-2019-cost-of-a-data-breach-report/ ].

Steel, Passwords Are Still a Problem According to the 2019 Verizon Data Breach Investigations Report, LastPass Blog, dated May 21, 2019, 4 pages. Retrieved on Oct. 2, 2021. Retrieved from the internet [URL: https://blog.lastpass.com/2019/05/passwords-still-problem-according-2019-verizon-data-breach-investigations-report/ ].

Lu, "How Much are Password Resets Costing Your Company?", Okta, dated Aug. 20, 2019, 2 pages. Retrieved on Oct. 2, 2021. Retrieved from the internet [URL: https://www.okta.com/blog/2019/08/how-much-are-password-resets-costing-your-company/ ].

Bourque, Ditching passwords and increasing e-commerce conversion rates by 54%, CIO, dated May 1, 2017, 4 pages. Retrieved on Oct. 2, 2021. Retrieved from the internet [URL: https://www.cio.com/article/3193206/ditching-passwords-and-increasing-ecommerce-conversion-rates-by-54.html ].

StClair et. al., Blockchain, Interoperability, and Self-Sovereign Identity: Trust Me, It's My Data, Blockchain in Healthcare Today, dated Jan. 6, 2020, 3 pages. Retrieved on Oct. 3, 2021. Retrieved from the internet [URL: https://blockchainhealthcaretoday.com/index.php/journal/article/view/122/144 ].

Heath, SolarWinds hack was 'largest and most sophisticated attack' ever—Microsoft president, Financial Post, dated Feb. 14, 2021, 3 pages. Retrieved on Oct. 3, 2021. Retrieved from the internet [URL: https://financialpost.com/pmn/business-pmn/solarwinds-hack-was-largest-and-most-sophisticated-attack-ever-microsoft-president ].

Covid-19 Credentials Initiative, Hello World from the Covid-19 Credentials Initiative, dated Jun. 25, 2020, 3 pages. Retrieved on Oct. 3, 2021. Retrieved from the internet [URL: https://cci-2020.medium.com/hello-world-from-the-covid-19-credentials-initiative-6d45534c4b3a ].

Bossert, I Was the Homeland Security Adviser to Trump. We're Being Hacked., The New York Times, dated Dec. 16, 2020, 3 pages. Retrieved on Oct. 3, 2021. Retrieved from the internet [URL: https://www.nytimes.com/2020/12/16/opinion/fireeye-solarwinds-russia-hack.html ].

Krebs, At Least 30,000 U.S. Organizations Newly Hacked via Holes in Microsoft's Email, Krebson Security, dated Mar. 5, 2021, 6 pages. Retrieved on Oct. 3, 2021. Retrieved from the internet. [URL: https://krebsonsecurity.com/2021/03/at-least-30000-u-s-organizations-newly-hacked-via-holes-in-microsofts-email-software/ ].

Newton, The battle inside Signal, The Verge, dated Jan. 25, 2021, 19 pages. Retrieved on Oct. 3, 2021. Retrieved from the internet. [URL: https://www.theverge.com/platform/amp/22249391/signal-app-abuse-messaging-employees-violence-misinformation ].

Tobin et. al., The Inevitable Rise of Self-Sovereign Identity, Sovrin Foundation Whitepaper, updated Mar. 28, 2017, 24 pages. Retrieved on Oct. 3, 2021. Retrieved from the internet [URL: https://sovrin.org/wp-content/uploads/2018/03/The-Inevitable-Rise-of-Self-Sovereign-Identity.pdf ].

Mitre, Broad Coalition of Health and Technology Industry Leaders Announce Vaccination Credential Initiative to Accelerate Digital Access to Covid-19 Vaccination Records, dated Jan. 14, 2021, 5 pages. Retrieved on Oct. 3, 2021. Retrieved from the internet [URL: https://www.businesswire.com/news/home/20210114005294/en/Broad-Coalition-of-Health-and-Technology-Industry-Leaders-Announce-Vaccination-Credential-Initiative-to-Accelerate-Digital-Access-to-COVID-19-Vaccination-Records ].

The Commons project, Unlocking the full potential of technology and data for the common good, 2019-2021, 5 pages. Retrieved on Oct. 3, 2021. Retrieved from the internet [URL: https://thecommonsproject.org/commonpass ].

What are Smart Health Cards?, Smart Health Cards Framework, 2021, 4 pages. Retrieved on Oct. 3, 2021. Retrieved from the internet [URL: https://smarthealth.cards/ ].

U.S. Department of Health and Human Services, Food and Drug Administration, Identifying Trading Partners Under the Drug Supply Chain Security Act, Guidance for Industry, dated Aug. 2017, 18 pages. Retrieved on Oct. 3, 2021. Retrieved from the internet [URL: https://www.fda.gov/files/drugs/published/Identifying-Trading-Partners-Under-the-Drug-Supply-Chain-Security-Act-Guidance-for-Industry.pdf ].

HDA Saleable Returns Pilot Study Identifies Two Recommendations to Meet 2019 DSCSA Requirements, Healthcare Distribution Alliance (HDA), dated Nov. 10, 2016, 5 pages. Retrieved on Oct. 3, 2021. Retrieved from the internet [URL: https://www.hda.org/news/2016-11-10-hda-pilot-results-revealed ].

FDA's Technology Modernization Action Plan (TMAP), Food and Drug Administration (FDA), dated Sep. 18, 2019, 10 pages. Retrieved on Oct. 3, 2021. Retrieved from the internet [URL: https://www.fda.gov/media/130883/download].

GS1 Standards Resources for DSCSA Implementation Support, GS1 US, dated Feb. 22, 2021, 7 pages. Retrieved on Oct. 3, 2021. Retrieved from the internet [URL: https://www.gs1us.org/industries/healthcare/standards-in-use/pharmaceutical/dscsa-resources ].

(56) References Cited

OTHER PUBLICATIONS

Ashkar et. al., Evaluation of Decentralized Verifiable Credentials to Authenticate Authorized Trading Partners and Verify Drug Provenance, Blockchain for Healthcare Today, dated Mar. 11, 2021, 14 pages. Retrieved on Oct. 3, 2021. Retrieved from the internet [URL: https://blockchainhealthcaretoday.com/index.php/journal/article/view/168 ].

Sporny et. al., Verifiable Credentials Data Model 1.0, W3C Working Group. dated Nov. 19, 2019, 122 pages. Retrieved on Oct. 3, 2021. Retrieved from the internet [URL: https://www.w3.org/TR/vc-data-model/ ].

Reed et. al., What are Decentralized Identifiers (DIDs)?, Evernym on Slideshare, dated Sep. 30, 2019, 29 pages. Retrieved on Oct. 3, 2021. Retrieved from the internet [URL: https://www.slideshare.net/Evernym/what-are-decentralized-identifiers-dids ].

Object Management Group Issues Request for Information for Disposable Self-Sovereign Identity Standard, Object Management Group (OMG), dated Jan. 21, 2021, 3 pages. Retrieved on Oct. 3, 2021. Retrieved from the internet [URL: https://www.omg.org/news/releases/pr2021/01-21-21.htm ].

Lodder et al., Sovrin DID Method Specification, Sovrin Foundation, dated Aug. 20, 2021, 16 pages. Retrieved on Oct. 3, 2021. Retrieved from the internet [URL: https://sovrin-foundation.github.io/sovrin/spec/did-method-spec-template.html ].

U.S. Appl. No. 17/492,488, filed Oct. 1, 2021, Allowed.
U.S. Appl. No. 17/982,518, filed Nov. 7, 2022, Pending.
U.S. Appl. No. 17/982,507, filed Nov. 7, 2022, Pending.
U.S. Appl. No. 17/982,509, filed Nov. 7, 2022, Pending.

Hammi, M.T.et al., Apr. 2018. "BCTrust: A decentralized authentication blockchain-based mechanism". In 2018 IEEE wireless communications and networking conference (WCNC) (pp. 1-6). IEEE. (Year: 2018), in 6 pages.

Prabha, P. et al., Dec. 2020. Securing telecare medical information system with blockchain technology. In 2020 2nd International Conference on Advances in Computing, Communication Control and Networking (ICACCCN) (pp. 846-851). IEEE. (Year: 2020), in 6 pages.

\* cited by examiner

US 11,741,216 B1

CREDENTIAL REVOCATION LEVERAGING PRIVATE KEYS ON KEYSTORES READ BY PROVISIONED DEVICES

RELATED APPLICATION

This application is related to the following application which is incorporated by reference herein for all purposes:

U.S. Nonprovisional patent application Ser. No. 17/492,488, titled "Decentralized Identity Authentication Framework for Distributed Data," filed Oct. 1, 2021.

FIELD OF INVENTION

The technology disclosed relates generally to decentralized identity authentication and management in a network of computers and corresponding data processing methods and products implementing secure authentication of users and user credential claims for access to a distributed, permissioned data structure shareable among disparate enterprises. In particular, the technology disclosed relates to using security software technology to implement authentication and credentialing by a trusted party of a non-credentialed user, enabling controlled access to secure permissioned blockchain data distributed among disparate enterprise actors.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Contemporary mobile devices (e.g., smartphones, tablet computers, and wearable devices such as smartwatches, and integrated circuit cards) have incorporated significant advancements in sensing technologies such as camera quality, geolocation sensing, and biometric authentication. Sensing technologies within recent generations of mobile devices are frequently comparable in functionality to those of industry-standard devices used by an enterprise (such as a business, company, firm, venture, partnership, and many other collaborative entities) in operations ranging from supply chain management and employee training to point-of-sale transactions. The use of mobile devices for business operations is advantageous due to the familiarity of these devices to workers of diverse backgrounds and skill levels.

With great power comes great responsibility; as well as great potential for chaos. Workers are known for sharing passwords without authorization, and the problem compounds when devices can be shared with other workers. Further, the rise of the "gig" economy has created a new segment of the workforce—those with a "loose affiliation" to an enterprise or multiple, potentially competing, enterprises.

An opportunity arises for improving the provisioning of devices for use in the workplace, and controlling the revocation of user credentials granted to users of these provisioned devices.

BRIEF DESCRIPTION OF DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
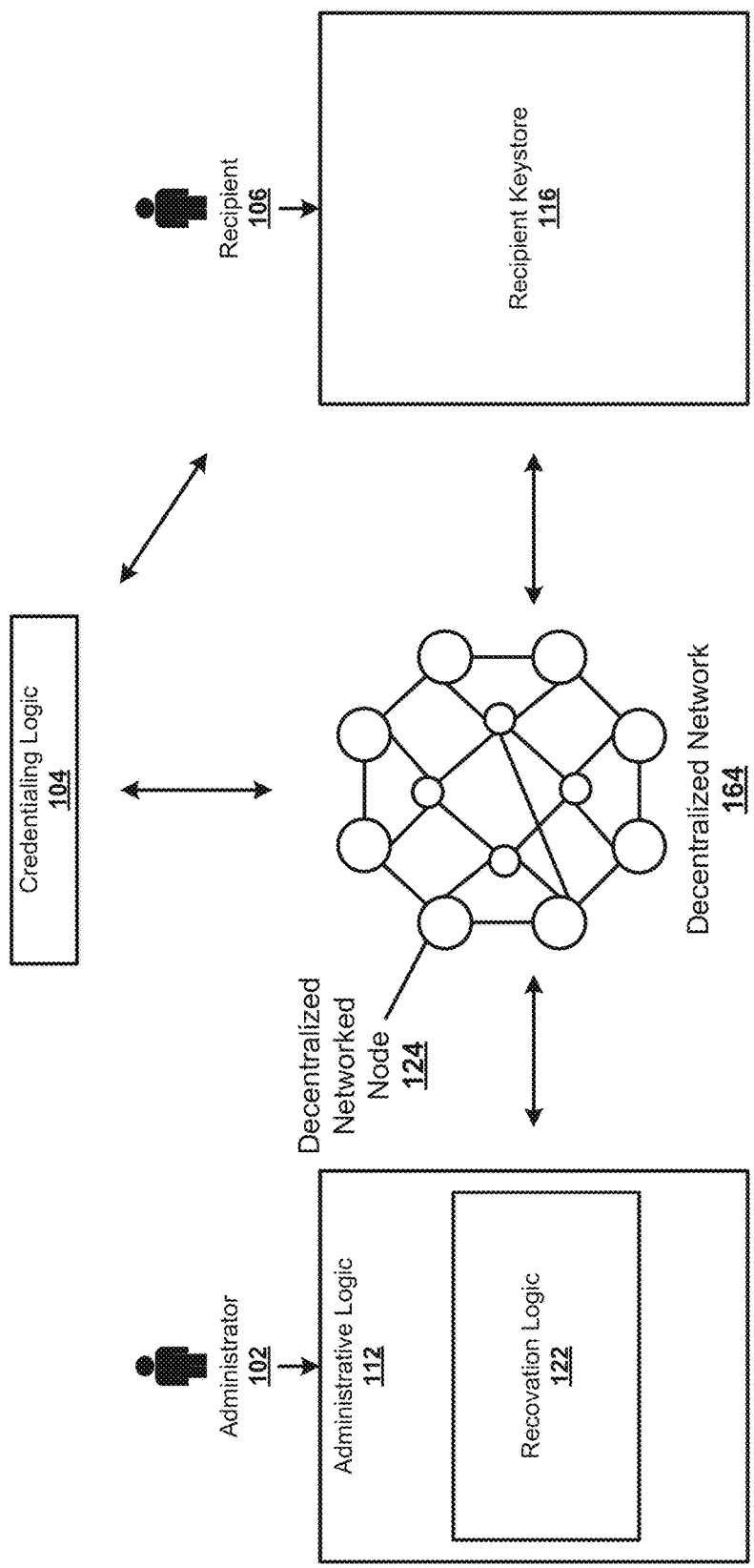
FIG. 1 shows an architectural level diagram of a system for revocation of user credentials leveraging private keys on provisioned devices.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Introduction

In identity and access management (IAM) systems, identity can be established through workflows encompassing application, review, and provisioning. Enterprises may provision administrators with the ability to define user roles and access privileges, but this approach can create significant bottlenecks and review overhead. In many cases, a centralized IAM system may be insufficiently flexible or efficient to accommodate the needs of individuals within an enterprise. An administrator may wish to give an individual user credentials so that the individual can receive temporary or limited access to certain privileges without waiting for a third-person administrator to approve or sharing all of their user information and access with the individual (or with a third-party administrator). While the individual may be acting on the administrator's behalf, the actions must be logged and tracked separately with a high degree of certainty which person performed each particular action.

Many centralized systems (e.g., cloud-based file storage solutions) accommodate this requirement by allowing users to invite other users to access shared resources. However, this still requires that credentialing and access are centrally managed, and often leverages email-based communications, particularly when the two users are not part of the same organization. This creates a point of failure that is highly vulnerable to compromise by bad actors.

Moreover, mobile devices have also made possible the introduction of new cryptographic capabilities that enable users to retain their own private keys locally rather than in cloud storage. In contrast to retaining private keys in cloud-based repositories, locally-sequestered private keys prevent a single party from having comprehensive access to an enterprise's identity and access management (IAM) framework. Hence, in the event that enterprise servers are breached, attackers are unable to impersonate existing users, as they would not have access to any user private keys. Provisioning of so-called self-sovereign credentials and delegation of access privileges leveraging private keys on uniquely identifiable devices provides efficacious IAM solutions for a variety of enterprises such as healthcare organizations, financial institutions, and non-profit organizations. For example, in the pharmaceutical supply chain, access management and auditability requirements demand that each interaction with privileged systems must be traceable to a single individual user.

In addition to the provisioning of user credentials and access delegation, secure IAM systems also require a robust and efficient method for revocation of user credentials or user access privileges. Many potential reasons exist for a credential to be revoked, including but not limited to: a user losing their physical keystore, a user being fired, transferred, demoted, or retiring, a user's external status being changed (such as a lapsed or changed official registration or licensure), a user's time-limited authority expiring, a device being lost, a suspected or confirmed security breach, or a blockchain event-generated revocation based on machine learning-detected bad behavior or similar conditions.

The technology disclosed comprises an implementation for revoking identity credentials based on physical parameters within a nested architecture of decentralized credentials that includes delegation of authority. In the event of a compromise, the issuing party could issue revocations for a particular set of identity credentials without wiping out the entire public key registry (or, as has been seen in the aftermath of major data breaches, undergoing years of cleanup and reconciliation rather than clearing a severely compromised registry).

The disclosed system comprises an implementation for leveraging self-sovereign credentials held on mobile devices to revoke credentials that removes the access of one party ("recipient" or "user", used synonymously herein) to obtain credentialed access to information and resources on behalf of another party ("sender" or "administrator", used synonymously herein), without either party exposing private key information to each other or to the cloud. The sender is able to revoke user credentials at any time. Revocation of a recipient's authorization can in turn trigger revocation of any access authorities that recipient delegated to other recipients. Further, some delegations of authority can be evanescent, e.g., limited in duration by a passage of time or occurrence or absence of an event, after which the authority is no longer delegated.

In some implementations, self-sovereign credentials are sequestered locally to a uniquely identifiable user device, such as a smart phone or identity badge (e.g., radio frequency identification (RFID), near-field communication (NFC) tags, integrated circuit cards, Bluetooth-enabled mobile devices, and so on). Providing users with self-sovereign credentials enables the sharing of access to data in a way that does not require the use of insecure sharing mechanisms as a sole means of authentication (e.g., email or SMS), does not require centralized credential management, and enables the sender and recipient of access credentials to validate each other's identities and share permissioned access to sensitive systems and data with a high degree of confidence. Users on a common shared directory can share and delegate access without exposing private key information; such directories might be very large and encompass entire communities comprising multiple organizations. For users who are not on a common shared directory, the invention leverages widely available and commonly used commodity hardware combined with physical affordances to rapidly enable decentralized access delegation and secure communications.

Cloud-based user authentication often requires that plaintext passwords be exposed at time of login; while these passwords are hashed and salted, there are cases where the memory is not erased and therefore passwords remain vulnerable to bad actors. In the disclosed system, a private key may remain locally-stored on a single-tenant user device, or stored on a keystore read by a multi-tenant user device. In the multi-tenant user device use case, the private key only has a short, finite tenure on the multi-tenant user device after which all related sensitive material is wiped. In both the single-tenant and multi-tenant user device scenarios, private keys never reach the server; thus, if the server were breached, an attacker would be unable to impersonate an existing user. In the event of a compromise, the issuing party can issue revocations for a particular set of identity credentials without wiping out the entire public key registry. As a result, the likelihood of a major data breach is substantially decreased.

Moreover, certain implementations of the technology disclosed comprise a plurality of verification and "checks-and-balances" systems through additional engines within the IAM system for the verification of any access modification, as well as a connection to one or more servers to receive from a government or a private licensure authority, information including one or more of an approval, an issuance, a revocation, or a suspension, of a license, and a trained classifier to classify the information as to whether a change in privilege or status of a credentialled individual is indicated.

Architecture

FIG. 1 shows an architectural level diagram of a system 100 for revocation of user credentials leveraging private keys on provisioned devices. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes an administrative device 112 accessible by an administrator 102, a decentralized network 164, a credentialing logic 104, and a recipient keystore 116 accessible by a recipient 106. Administrative device 112 comprises a revocation logic 122.

Administrative device 112, recipient keystore 116, and credentialing logic 104 within system 100 interact with a decentralized network 164, wherein decentralized network 164 comprises a plurality of decentralized network nodes such as decentralized networked node 124. In some implementations of the technology disclosed, decentralized network 164 is a private permissioned blockchain data structure. In other implementations, decentralized network 164 is an alternative decentralized personal ledger data structure.

In the interconnection of the elements of system 100, communication may occur over one or more cloud servers. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi, and WiMAX.

Further continuing with the description of the system 100, components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

System 100 is configured to revoke user credentials for access to a decentralized networked node 124 within decentralized network 164, to which access has been limited to users authorized by decentralized networked node 124.

Administrator 102 uses revocation logic 122, running on administrative device 112, to revoke from a recipient 106, credentialling electronic presentation of one or more instances of electronic evidence personally identifying a recipient 106 or revoking support for any credentialling being sought and a keystore to hold access to any credentialling issued.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Decentralized Revocation of User Credentials and Device Credentials

To elaborate further on the interconnectedness of the components of system 100, a series of message flow diagrams and schematic diagrams are now described for the revocation of user credentials, device credentials, and access credentials leveraging private keys stored locally on provisioned devices.

Figure 2:
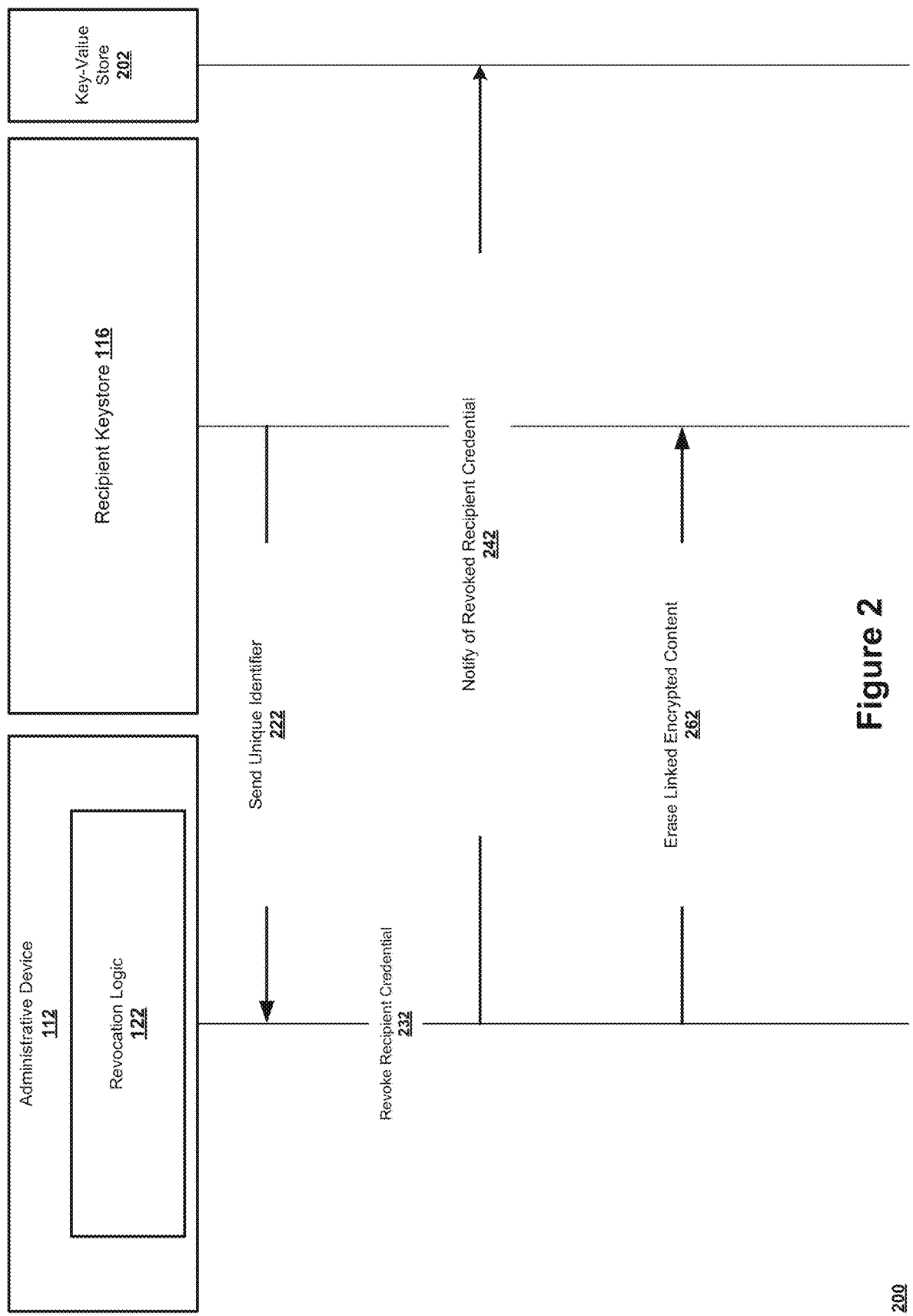
FIG. 2 shows a message flow diagram for user credential revocation leveraging private keys stored on provisioned devices.

FIG. 2 shows a message flow diagram 200 for user credential revocation leveraging private keys stored on provisioned devices. When an administrator 102 intends to revoke a credential from a particular recipient, the administrator 102 invokes revocation through revocation logic 122 running on administrative device 112. The administrative device 112 can request a unique identifier from the recipient keystore 116 in step 222, such as the recipient private key or the device private key. If the recipient keystore 116 is not present, the administrative device 112 may also communicate with key-value store 202 to receive a recipient public key or recipient identifier such as an email address, phone number, or license number. In step 232, the administrative device revokes the recipient credential using the administrative private key or a smart contract private key respective to a particular privilege. In other implementations, access for a particular recipient may also be automatically revoked upon meeting a certain expiration term such as a time limit, resource usage limit, or location restriction. Following revocation, the change in status is communicated to key-value store 202 in step 242. As a result, the administrative device may erase any linked encrypted content from the recipient keystore 116 in step 262.

Figure 3:
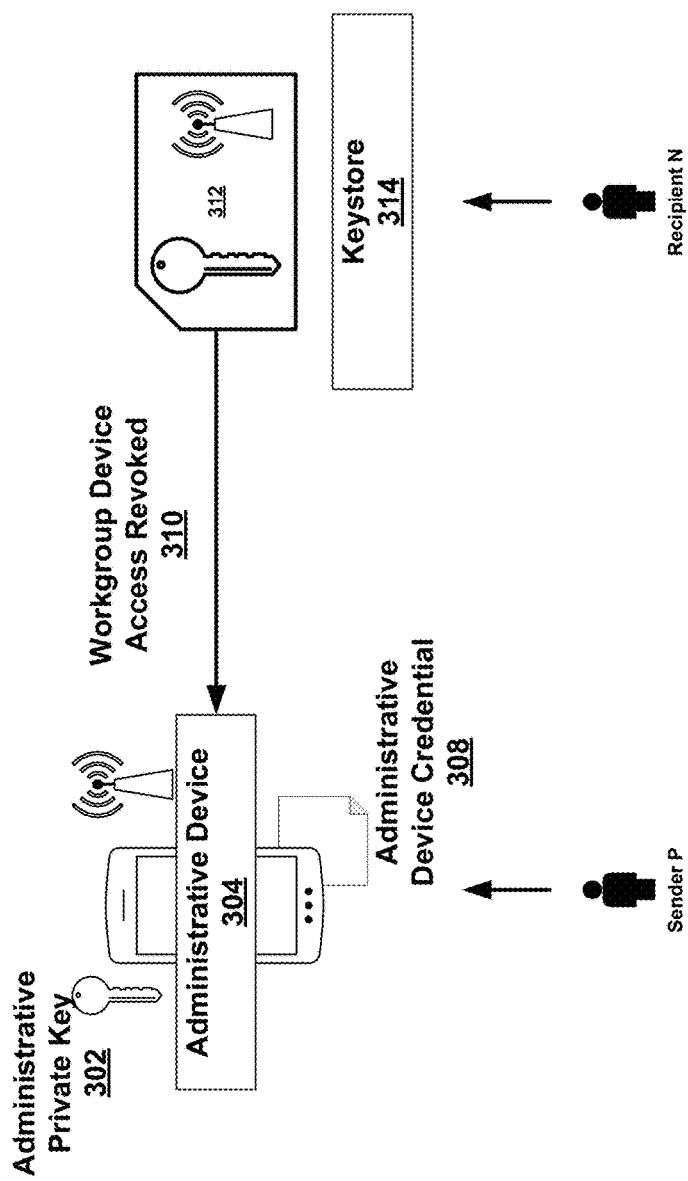
FIG. 3 shows a schematic diagram for revocation of access privileges to a workgroup device for a user keystore.

FIG. 3 shows a schematic diagram for revocation of access privileges to a workgroup device for a user keystore. An administrator, such as Sender P, employs an administrative device 304 with the use of their administrative private key 302, to revoke access to a workgroup device from a Recipient N. The administrative device credential 308 authorizes the administrative device 304 to access necessary decentralized networked nodes within decentralized network 164 for the management of credentialing, and Sender P's credentials 302 authorize Sender P to issue revocation transactions to decentralized network 164. Recipient N uses keystore 314, comprising Recipient N's private key 312, to access a workgroup device. Recipient N has previously been delegated access to the workgroup device; however, Sender P now desires to revoke this access. Using close-range communication to obtain Recipient N's private key 312, the administrative device 304 revokes Recipient N's access credential authorizing Recipient N to access the workgroup device in step 310. Keystore 314 still stores Recipient N's private key 312 and is usable by Recipient N; however, Recipient N will no longer be able to successfully authenticate into the workgroup device.

Figure 4:
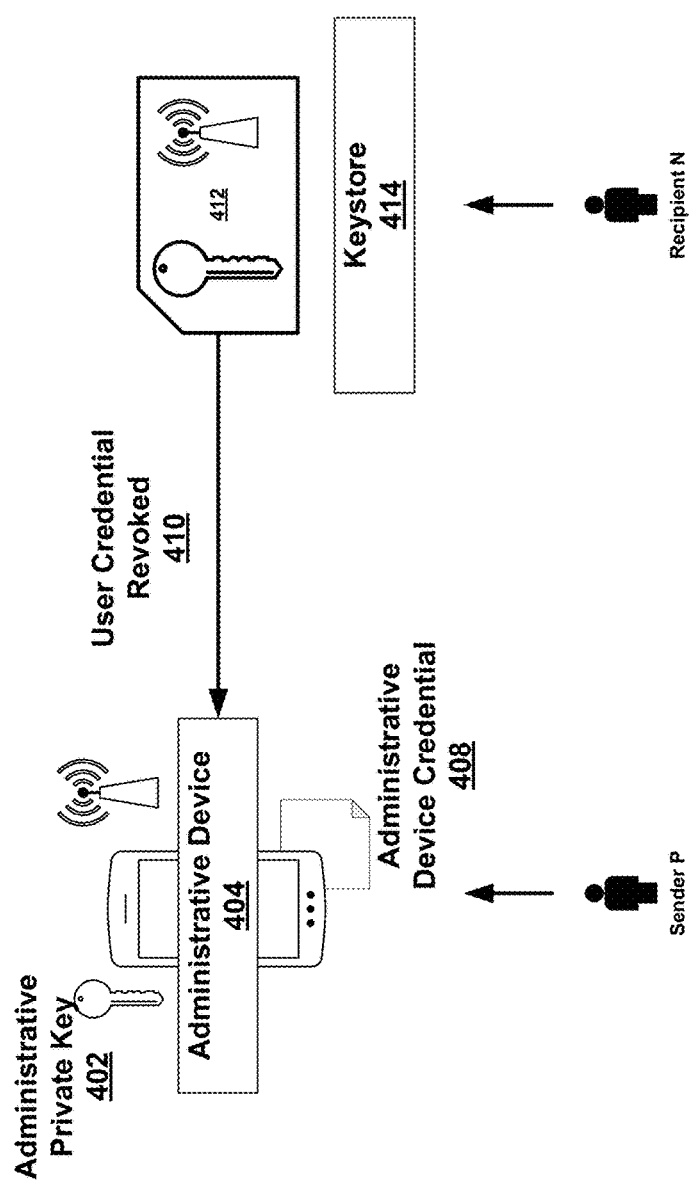
FIG. 4 shows a schematic diagram for revocation of user credentials for a user keystore.

FIG. 4 shows a schematic diagram 400 for revocation of user credentials for a user keystore. In contrast to diagram 300, the scenario depicted in scenario 400 involves full revocation of the user credentials for Recipient N, resulting in Recipient N no longer being associated with the keystore in contrast to simply resulting in a reduction of privileges authorized for Recipient N.

An administrator, such as Sender P, employs an administrative device 404 with the use of their administrative private key 402, to revoke all user credentials from a Recipient N. The administrative device credential 408 authorizes the administrative device 304 to access necessary decentralized networked nodes within decentralized network 164 for the management of credentialing, and Sender P's credentials 402 authorize Sender P to issue revocation transactions to decentralized network 164. Recipient N uses keystore 414, comprising Recipient N's private key 412, to access delegated privileges. Recipient N has previously been delegated access to particular resources; however, Sender P now desires to revoke this access. Using close-range communication to obtain Recipient N's private key 412, the administrative device 404 revokes Recipient N's user credential in step 410. Keystore 414 still comprises its own set of provisioned credentials to receive a user private key and to access decentralized networked nodes within decentralized network 164; however, it will no longer store Recipient N's private key 412 and will thus be unusable by Recipient N. In the future, Sender P may choose to provision keystore 414 to another recipient, which keystore 414 is still configured to receive.

Figure 5:
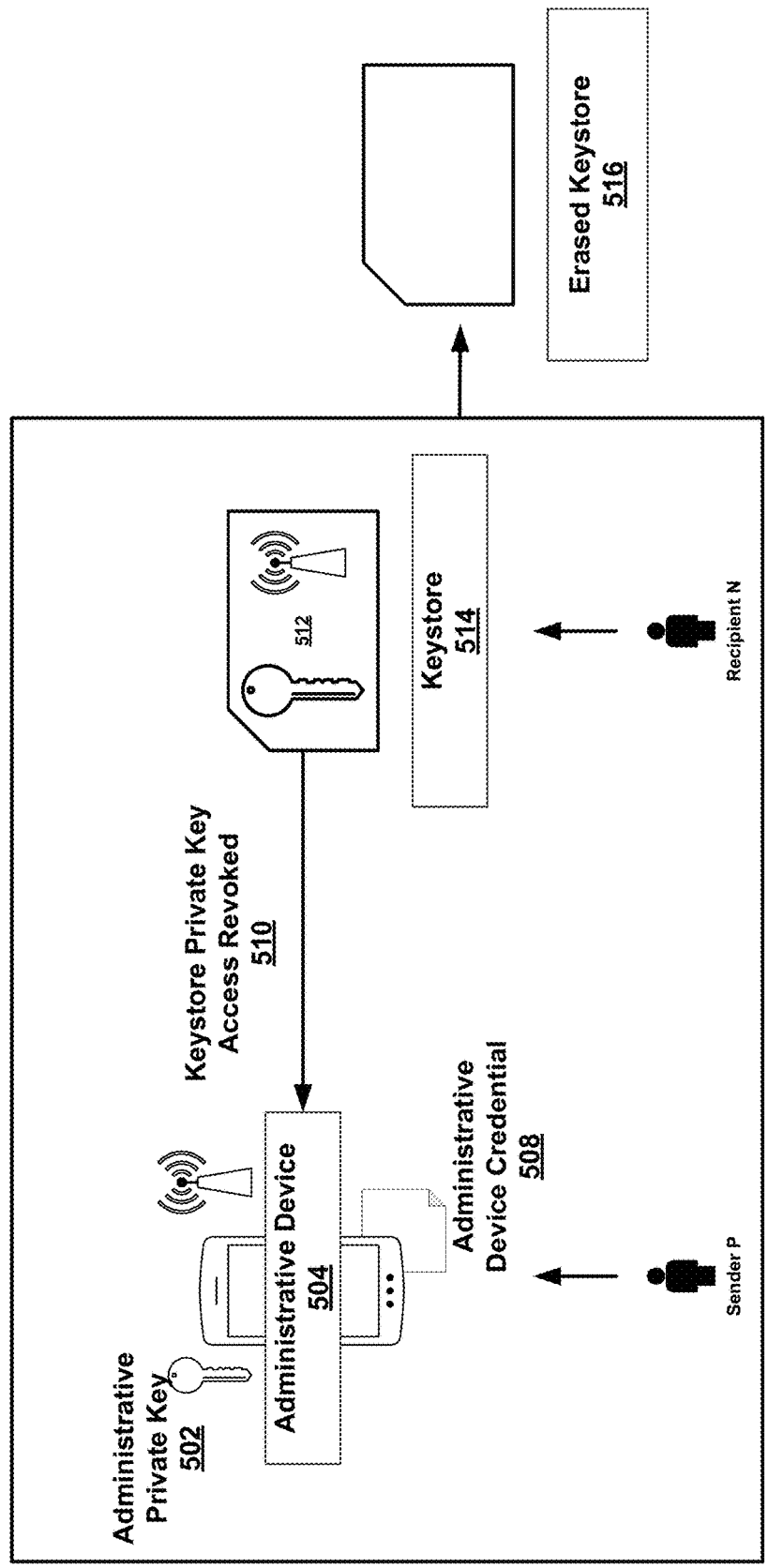
FIG. 5 shows a schematic diagram for revocation of user credentials for a user keystore, wherein the user credentials are erased from user keystore.

In certain scenarios, it may be deemed necessary for a user keystore to be fully erased for all sensitive data, preventing the keystore from being used maliciously in the event that a breach allows the keystore to be inappropriately provisioned to a bad actor. FIG. 5 shows a schematic diagram 500 for revocation of user credentials for a user keystore, wherein the user credentials are erased from user keystore.

An administrator, such as Sender P, employs an administrative device 504 with the use of their administrative private key 502, to revoke all user credentials from a Recipient N. The administrative device credential 508 authorizes the administrative device 504 to access necessary decentralized networked nodes within decentralized network 164 for the management of credentialing, and Sender P's credentials 502 authorize Sender P to issue revocation transactions to decentralized network 164. Recipient N uses keystore 514, comprising Recipient N's private key 512, to access delegated privileges. Keystore 514 also possesses its own set of provisioned credentials to receive a user private key and to access decentralized networked nodes within decentralized network 164. Using close-range communication to obtain the keystore's private key, the administrative device 504 revokes the device credential in step 510, resulting in erased keystore 516 that may be considered to be "zeroed out", lacking any configuration related to the enterprise.

In certain scenarios, it may be necessary to erase a keystore without having access to the keystore, such as a lost or stolen keystore. Thus, it is necessary for revocation transactions to still be possible without requiring close-range communication between devices.

Figure 6:
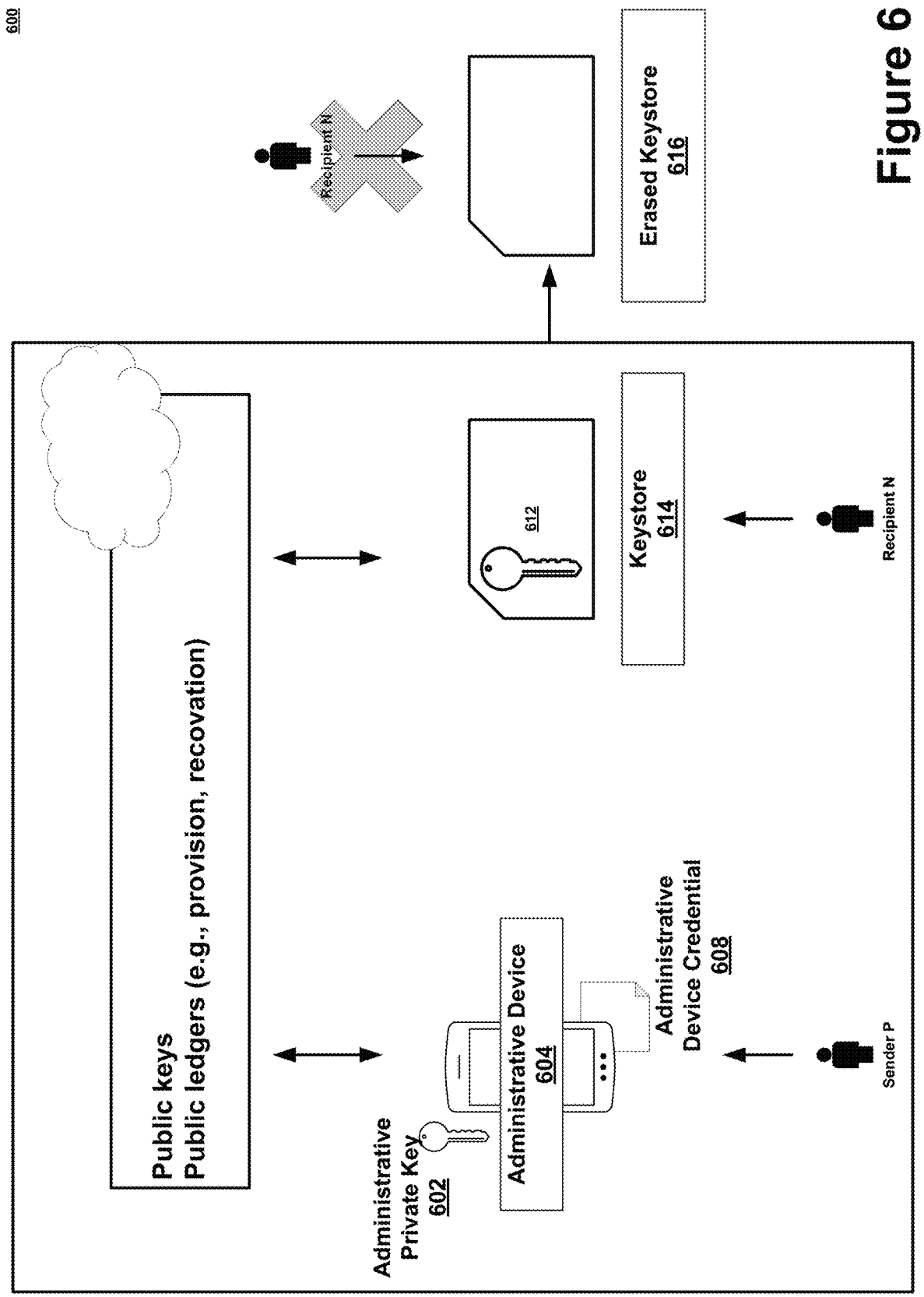
FIG. 6 shows a schematic diagram for revocation of user credentials and device credentials for a user keystore, wherein the user keystore is not physically present.

FIG. 6 shows a schematic diagram 600 for revocation of user credentials and device credentials for a user keystore, wherein the user keystore is not physically present. The scenario depicted in diagram 600 assumes that the administrator has access to the unique identifier belonging to the keystore or the recipient. Similar to diagrams 400 and 500, Sender P uses administrative device 604 (comprising device credential 608 and administrative credential 602) to revoke access from keystore 614 (comprising a device credential as well as Recipient N's credential 612). However, whereas previous examples have used close-range communication, that is not possible within this scenario. Thus, scenario 600 takes advantage of the communication between provisioned devices with the cloud-based server contained within decentralized network 164, or connected to decentralized network 164. Administrative device 604 is able to write the revocation transaction, effectively generating an erased keystore 616 unusable by Recipient N. In certain implementations, this process also revokes all user credentials for Recipient N.

In addition to user keystores, devices used to access applications and resources related to decentralized network 164 may also be compromised and require revocation of device credentials.

Figure 7:
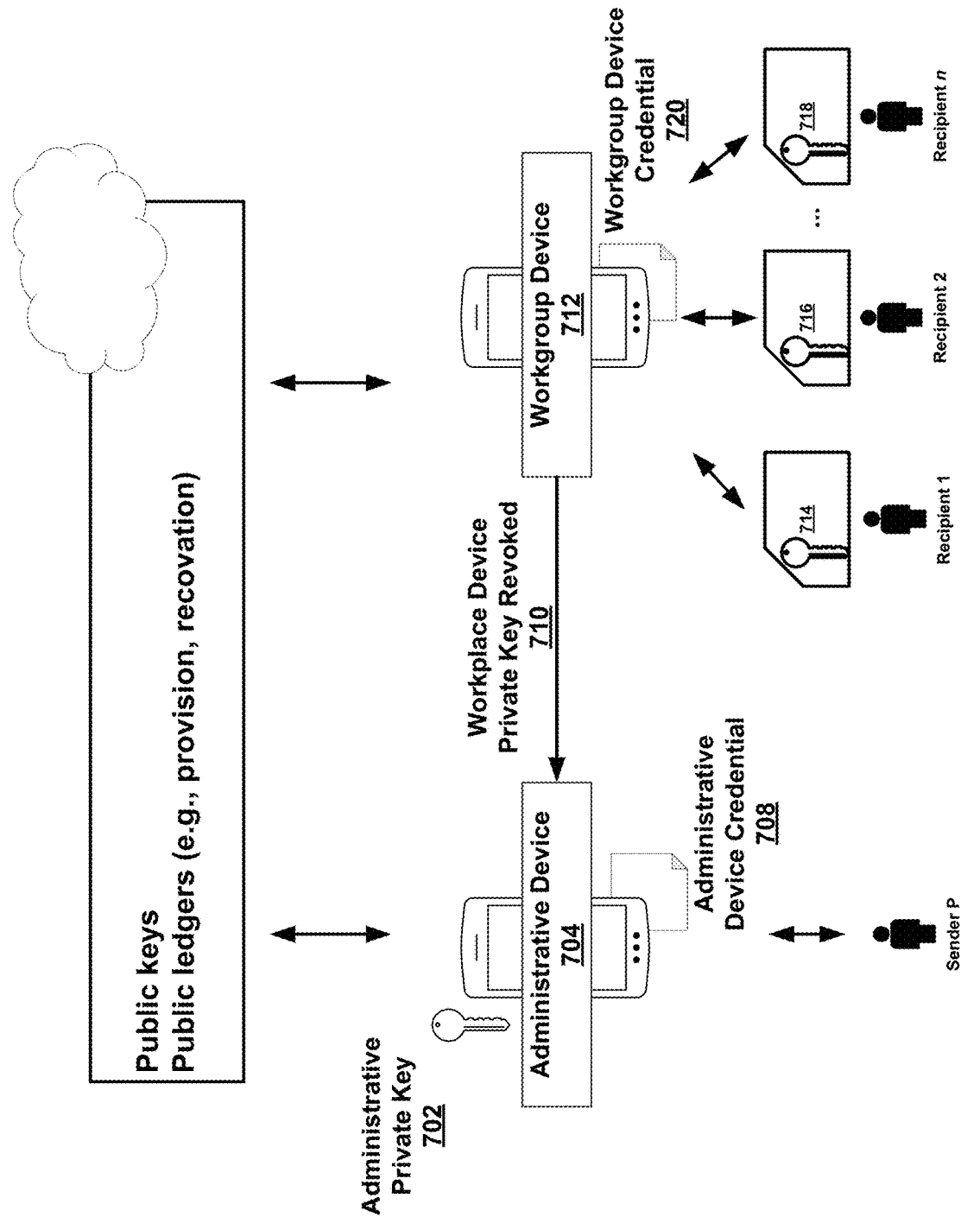
FIG. 7 shows a schematic diagram for revocation of device credentials for a workgroup device.

FIG. 7 shows a schematic diagram 700 for revocation of device credentials for a workgroup device. Sender P uses administrative device 704 (comprising device credential 708 and administrative credential 702) to revoke access from workgroup device 712 (comprising device credential 720). Workgroup device 712 is accessed by a plurality of recipients by reading keystores 714, 716, and 718, each storing a respective private key for a respective recipient. In the event that workgroup device 712 is compromised, administrative device may revoke the device credentials in step 710, preventing workgroup device 712 from accessing any decentralized networked nodes on decentralized network 164, or any databases and applications associated with decentralized network 164. This revocation may be issued using close-range communication, or by identifying workplace device 712 on a cloud-based database via its unique identifier. In some implementations, this may require revoking credentials for recipients that access workgroup device 712; however, in many implementations, it does not.

Figure 8:
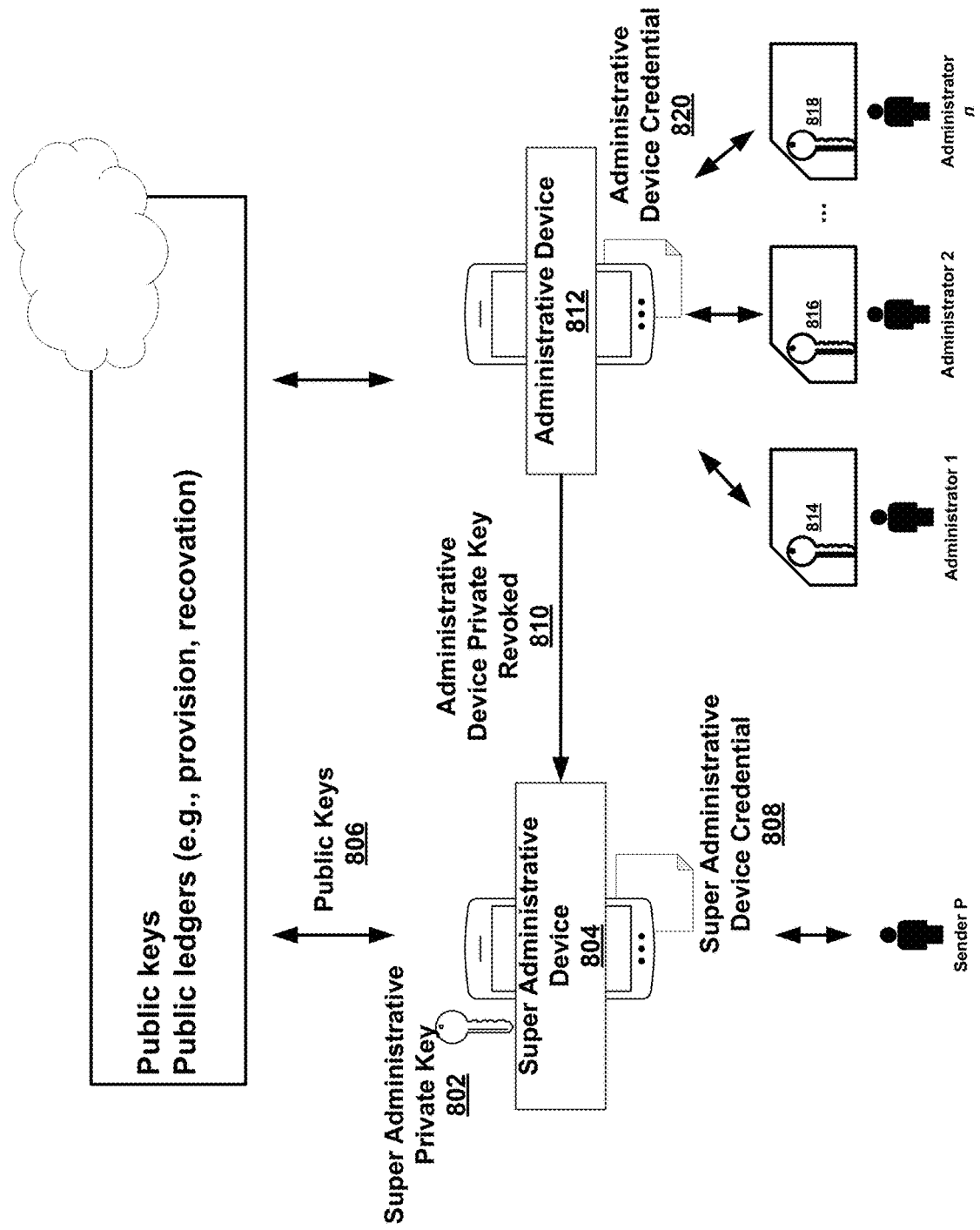
FIG. 8 shows a schematic diagram for revocation of device credentials for an administrative device.

FIG. 8 shows a schematic diagram 800 for revocation of device credentials for an administrative device. The scenario within diagram 800 is very similar to that of diagram 700; however, a super-administrator revokes access from a compromised administrative device 812. Sender P uses super-administrative device 804 (comprising device credential 808 and administrative credential 802) to revoke access from administrative device 812 (comprising device credential 820). Workgroup device 812 is accessed by a plurality of administrators by reading keystores 814, 816, and 818, each storing a respective private key for a respective recipient. In the event that administrative device 812 is compromised, super-administrative device may revoke the device credentials in step 810, preventing administrative device 812 from accessing any decentralized networked nodes on decentralized network 164, or any databases and applications associated with decentralized network 164. This revocation may be issued using close-range communication, or by identifying administrative device 812 on a cloud-based database via its unique identifier. In some implementations, this may require revoking credentials for administrators that access administrative device 812; however, in many implementations, it does not.

Figure 9A:
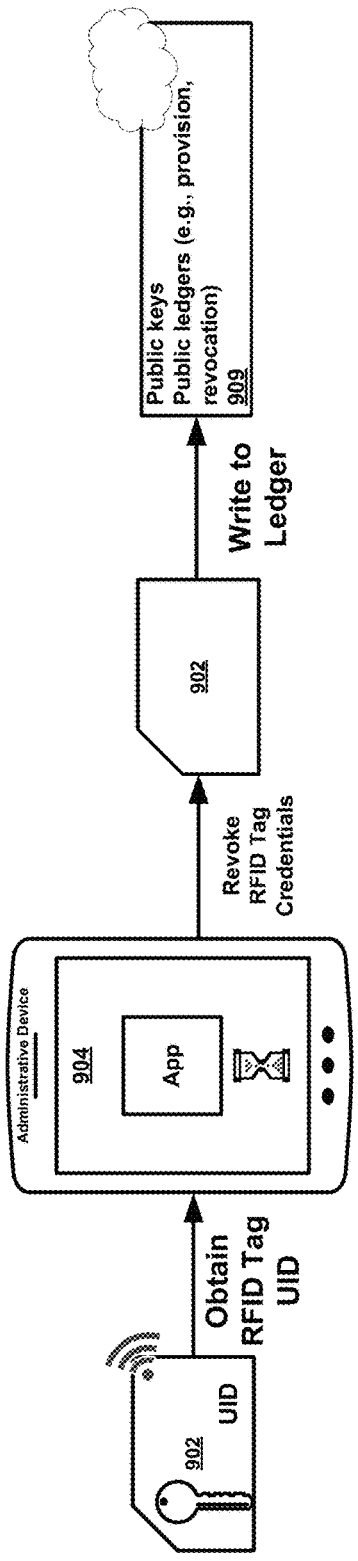
FIG. 9A shows a schematic diagram for revocation of user credentials wherein the user keystore is physically present, or the keystore identifier is known.
Figure 9A:
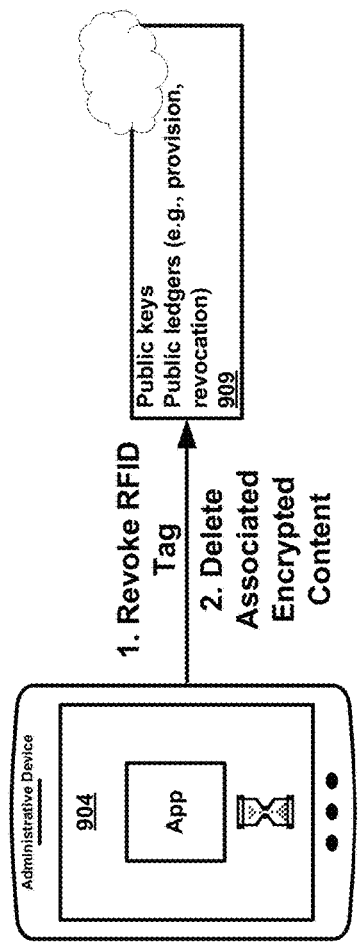

FIG. 9A shows a schematic diagram 900A for revocation of user credentials wherein the user keystore is physically present, or the keystore identifier is known. In scenario 910A, an RFID tag 902 is physically present for revocation. An administrative device 904, authorized to access an application connected to decentralized network 164, obtains a unique identifier for tag 902 (e.g., the tag public key determined using elliptic curve cryptography from the tag private key stored on tag 902). Administrative device 904 revokes the device credentials from tag 902, and writes the transactions to a ledger 909 within decentralized network 164. In scenario 920A, RFID tag 902 has been lost or stolen; however, a unique identifier is still known for tag 902. In some implementations, administrative device 904 is authorized to receive this information using decentralized network 164. Thus, administrative device 904 is still able to revoke access from tag 902 and delete any associated content with tag 902, communicating the information to ledger 909.

Figure 9B:
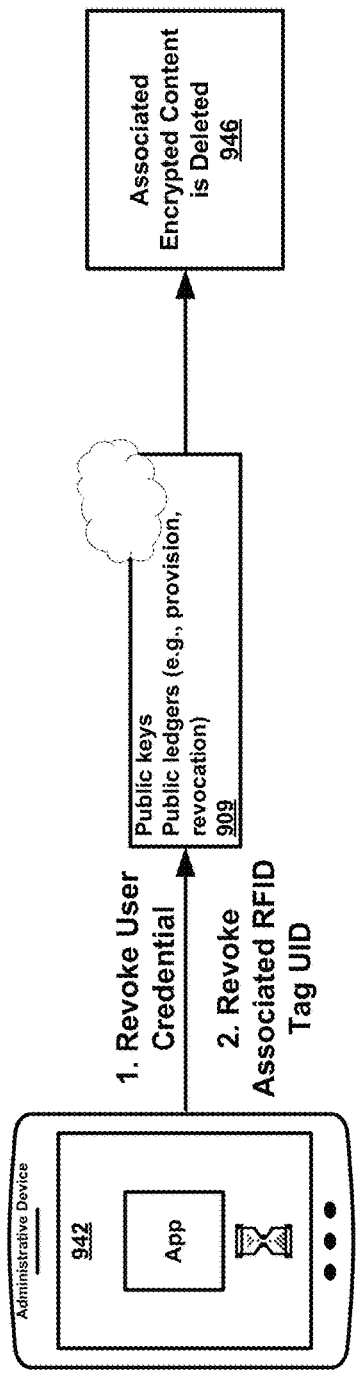
FIG. 9B shows a schematic diagram for revocation of user credentials, wherein the user credential identifier is known, or the user identity is known.
Figure 9B:
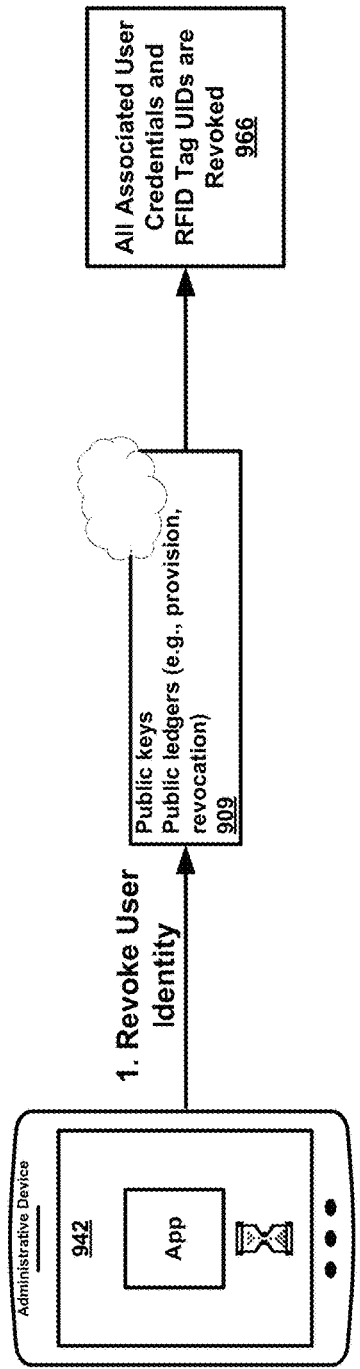

FIG. 9B shows a schematic diagram 900B for revocation of user credentials, wherein the user credential identifier is known, or the user identity is known. Even without a keystore or device present, the technology disclosed is able to use information and connections within decentralized network 164 to revoke credentials. In scenario 940B, this information is a user credential ID (e.g., user identifier or user public key, as identified from a key-value store or similar database located on a decentralized networked node within decentralized network 164 or a database connected to decentralized network 164). In scenario 960B, this information is associated with the user identity (e.g., an email address or phone number). In both scenarios, administrative device 942 can revoke the user credential, associated access credentials, and any additional associated sensitive data from any devices or data stored within decentralized network 164. In both cases, the transaction is written to ledger 909.

Privacy Protection Measures

The disclosed system implements a variety of privacy protection measures that will now be summarized to emphasize the tactics by which security risks are minimized. Private keys for all users are always stored locally on mobile devices, and private keys of separate users are sequestered on separate respective devices (i.e., individual recipients either use their own respective recipient device, or in the event that multiple recipients use a shared workgroup device, recipient private keys are stored in a separate keystore and the recipient private key is always erased from the workgroup device following authentication). Because each transaction and interaction with decentralized network 164 is directly tied to a particular user credential, and there is a detailed ledger of any access delegation transactions related to a particular action, each action may be clearly traced back to the specific responsible user.

The plurality of smart contract conditions implemented to limit conditional access delegation to recipients are structured such that access is frequently delegated through an evanescent credential and in the event that an access credential is invalidated or expires, any evidence supporting the recipient at expiry is automatically deleted. In addition to a number of conditional access limitations enacted by smart contracts, access is always revocable in a straightforward process where the administrator uses their own credentials or smart contract credentials to revoke the access credential. A transaction ledger comprises a record of all issuance, provisioning, delegation, and revocation transactions for the maintenance of integrity.

In many implementations of the technology disclosed, system 100 has access to one or more external servers corresponding to trusted sources (e.g., government organizations or credentialing agencies) for verification of a recipient's qualifications or clearance level prior to delegating access to a private permissioned function within the enterprise operations. In certain implementations of the technology disclosed, verification and modification logics are configured to verify that a change in user status or privileges is appropriate and enact the proper modification to distributed network 164. Some implementations further include a machine learning classifier trained to detect if a change in user status or privileges is warranted or if a change in user status or privileges is suspected for malicious or inappropriate access.

Enterprises may implement many levels of multi-factor authentication for their users prior to accessing sensitive information or resources. To access a particular application, data source, function, or resource, a user may require the use of two separate items: a mobile device and an additional keystore storing the user's private key. Moreover, one or both of these hardware devices may be configured to exclusively function at a particular location or while connected to a particular network. If a hardware device does not meet these requirements (or any qualifying event occurs resulting in an administrator desiring to restrict access to the device of concern), the device may refuse all authentication attempts or become "bricked" so that it is no longer functional.

A user may also require input of a passcode or biometric prior to authentication into an application. A user device may require close-range communication with a location-specific or administrator-managed hardware device prior to authentication. Any or all of the described authentication methods may be required in a multi-factor authentication process. For example, a user may use facial recognition to unlock a provisioned device, triggering the provisioned device to request communication with a keystore that contains the user private key. For further security, a user may also have to input a passcode to initiate recipient public key generation once the device has obtained a user private key. A user skilled in the art will be familiar with the variety of multi-factor authentication permutations that may be applied to the disclosed system. Devices may also be configured to automatically log a user out or erase any sensitive user information and therefore require re-authentication after a certain pre-determined period of time where the device is idle. If a user fails to successfully complete authentication a pre-determined number of attempts, the user credentials, device credentials, or both sets of credentials may be locked out pending review by an administrator.

For additional regulation of IAM systems, enterprises may also provision user credentials to one or more "super-administrators" responsible for the management of administrative credentials for one or more administrators. As a result of the decentralized structure of the disclosed system, it is simple to lock out a specific user, revoke the user's access credentials, or revoke the user credential entirely without affecting the access of unrelated devices and users. By means of locally-sequestered, self-sovereign user credentials, a breach of the key-value store would not allow a bad actor to impersonate any existing user within the database or directory. In the event that a bad actor obtains the necessary technology to impersonate a particular user and successfully authenticate into the user's access privileges for a period of time before an administrator is able to perform necessary revocations to control the risk, the bad actor will be limited to the particular user's access privileges and associated conditions imposed upon the delegated access (i.e., access to one user's information does not provide a route to access of another user's information, regardless of the breached user account's administrative status or clearance level).

As a result of the described precautions, the disclosed system is resistant to explosion of access rights, under-the-radar outdated access privileges, uncontrolled data leak events, and other sources of inappropriate authentication.

Computer System

Figure 10:
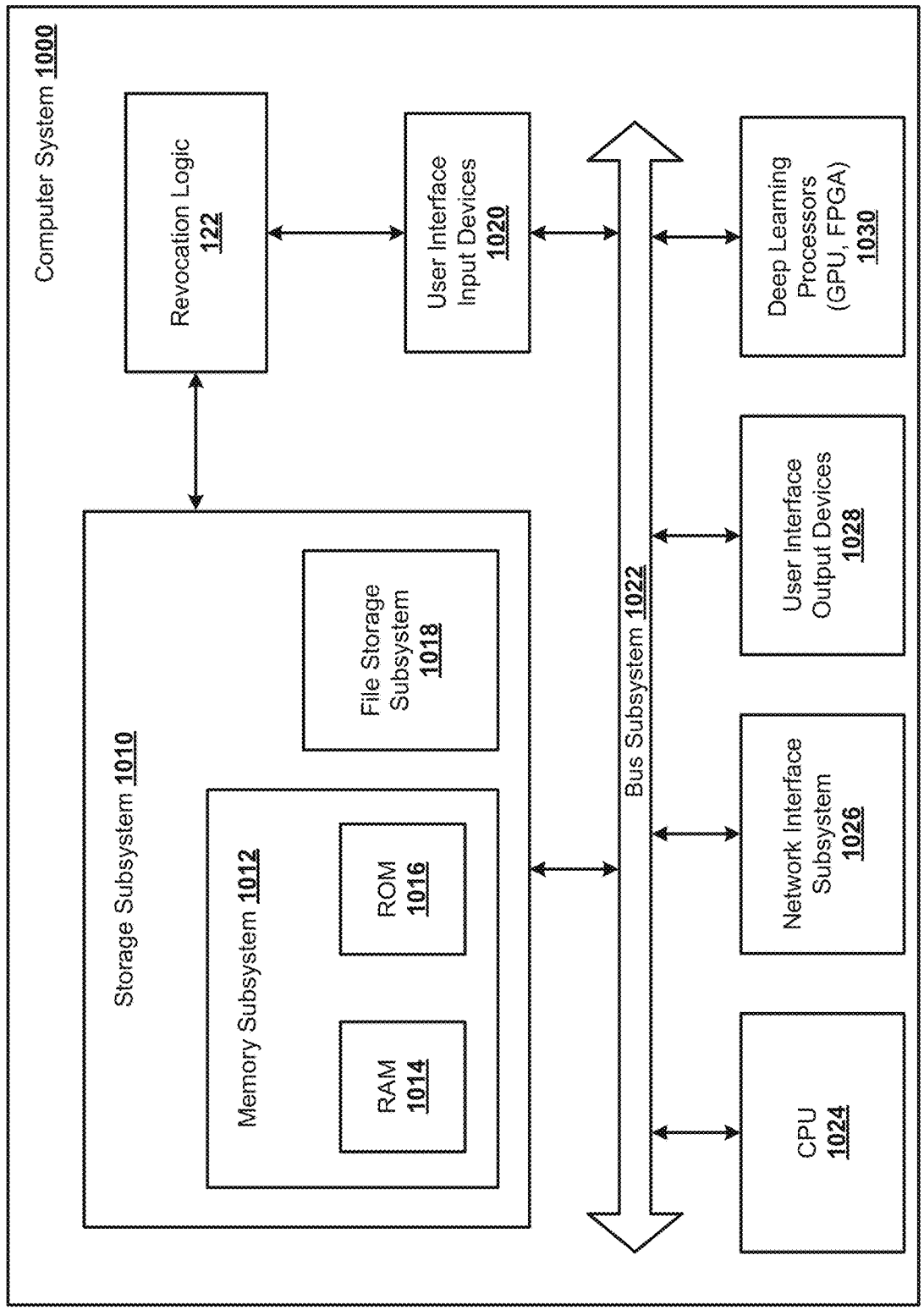
FIG. 10 shows an example computer system that can be used to implement the technology disclosed.

FIG. 10 is a simplified block diagram of a computer system 1000 that can be used for revocation of user credentials for controlling user access to a private permissioned blockchain data structure or decentralized personal ledger. Computer system 1000 includes at least one central processing unit (CPU) 1024 that communicates with a number of peripheral devices via bus subsystem 1022, and Revocation Logic 122, as described herein. These peripheral devices can include a storage subsystem 1010 including, for example, memory devices and a file storage subsystem 1018, user interface input devices 1020 user interface output devices 1028, and a network interface subsystem 1026. The input and output devices allow user interaction with computer system 1000. Network interface subsystem 1026 provides an interface to outside networks, including an interface to corresponding interface devices in other computer systems. Revocation Logic 122 is communicably linked to the storage subsystem 1010 and the user interface input devices 1020.

User interface input devices 1020 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1028 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1010 can be graphics processing units (GPUs) or field-programmable gate arrays (FPGAs).

Memory subsystem 1012 used in the storage subsystem 1010 can include a number of memories including a main random-access memory (RAM) 1016 for storage of instructions and data during program execution and a read only memory (ROM) 1016 in which fixed instructions are stored. A file storage subsystem 1018 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1018 in the storage subsystem 1010, or in other machines accessible by the processor.

Bus subsystem 1022 provides a mechanism for letting the various components and subsystems of computer system 1000 communicate with each other as intended. Although bus subsystem 1022 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely distributed set of loosely networked computers, or any other data processing system or user device. Due to the ever changing nature of computers and networks, the description of computer system 1000 depicted in FIG. 10 is intended only as a specific example for purposes of illustrating the preferred embodiments of the present invention. Many other configurations of computer system 1000 are possible having more or fewer components than the computer system depicted in FIG. 10.

Particular Implementations

We describe some implementations and for revocation of user credentials for controlling user access to a private permissioned blockchain data structure or decentralized personal ledger in the following discussion.

One implementation discloses a method for revocation of user credentials for controlling user access to a private permissioned blockchain data structure or decentralized personal ledger, comprising an administrative logic configured to de-configure user private keys from keystores of respective users. The administrative logic further comprises a revocation logic configured to receive a unique identifier linked to a keystore of a particular user in response to the keystore, and the revocation logic is further configured to revoke access of the keystore based on the unique identifier. Other embodiments of this method include corresponding computer systems, apparatus, and computer programs recorded on one or more computer storage devices, each configured to perform the actions of the methods.

Many implementations of the method further include a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some implementations, the method further includes user private keys that are maintained in keystores in custody of users, and user access based upon the user private keys is managed by one of a set of decentralized networked nodes sharing a private permissioned blockchain data structure, or decentralized personal ledger, to which access has been limited; thereby enabling controlling by a network node, user access to the private permissioned blockchain data structure or decentralized personal ledger. No transmissions to servers at any other network node need to occur in order to revoke the user private keys, thereby enabling bypassing server transmission channels when keys are revoked.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

One implementation of the method further includes informing another decentralized server that the user private keys have been revoked.

In some implementations of the method, one general aspect includes a system for revocation of user credentials controlling user access to a private permissioned blockchain data structure or a decentralized personal ledger to which access has been limited to users authorized by one of a set of decentralized networked nodes. The system also includes an administrative logic configured to deconfigure user private keys from keystores of respective users, wherein the administrative logic may include: a revocation logic configured to use a unique identifier linked to a keystore of a particular user to revoke access of the keystore based on the unique identifier, and the revocation logic can be further configured to erase encrypted content linked to the keystore based on the unique identifier. Other embodiments of this aspect include corresponding computer systems, apparatus, and computer programs recorded on one or more computer storage devices, each configured to perform the actions of the methods.

Other implementations of the technology disclosed further include initiating revocation of a private key in response to a near-field communication transaction (e.g., RFID) between a device running the revocation logic and the keystore.

Other implementations of the method further include a group including at least one of a formal organization, an informal organization, a loose confederation of traders, a single actor associated with one or more contractors, employees, or agents.

In some implementations of the disclosed technology, the user identifier is an e-mail of the particular user. In other implementations, the user identifier is a phone number of the particular user.

Certain implementations include an administrative logic configured to revoke access of a device that has been associated with one or more groups, where the device is configured to authenticate a plurality of users in a workgroup of the one or more groups, which may include: a revocation logic configured to write a workgroup public key linked to a device credential of the device to a certificate revocation list, and in turn cause revocation of access of a device identity of the device, revocation of access of the device, and revocation of access of the device credential.

Other implementations of the disclosed technology described in this section can include a tangible non-transitory computer-readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

Certain implementations are further configured to reissue user credentials of users in the plurality of users, to accept an association of a user's own device, or erase the device credential from the device.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A system comprising one or more processors coupled to memory storing instructions for revocation of user credentials for controlling user access to a private permissioned blockchain data structure or decentralized personal ledger to which access has been limited to users authorized by one of a set of decentralized networked nodes, which instructions when executed by the one or more processors implement:
   an administrative logic configured to deconfigure user private keys from keystores of respective users, comprising:
      a revocation logic configured to receive a unique identifier linked to a keystore of a particular user;
      the revocation logic further configured to revoke access of the keystore based on the unique identifier in response to the keystore or if the keystore is not present but a unique identifier linked to a particular user is known; and
      the revocation logic is further configured to erase encrypted content linked to the keystore based on the unique identifier notwithstanding absence of the keystore.

2. The system of claim 1, wherein the user private keys are maintained in keystores in custody of users, and wherein user access based upon the user private keys is managed by one of a set of decentralized networked nodes sharing a private permissioned blockchain data structure, or decentralized personal ledger, to which access has been limited; thereby enabling controlling by a network node, user access to the private permissioned blockchain data structure or decentralized personal ledger.

3. The system of claim 1, wherein no transmissions to servers at any other network node need to occur in order to revoke the user private keys.

4. The system of claim 1, further including informing another decentralized server that the user private keys have been revoked.

5. The system of claim 1, further including initiating revocation in response to a near-field communication transaction between a device running the revocation logic and the keystore.

6. The system of claim 1, further configured to revoke the access of the keystore by revoking access of a user private key stored on the keystore.

7. The system of claim 1, wherein the keystore includes a radio-frequency identification (RFID) tag.

8. The system of claim 1 further configured to revoke the access of the keystore by revoking access of a user private key stored on the keystore.

9. The system of claim 1 wherein the revocation logic is further configured to use a user public key of the particular user to revoke access of an encrypted user credential of the particular user.

10. The system of claim 1, wherein:
   the revocation logic is configured to use a user public key linked to an encrypted user credential of a particular user to revoke access of the encrypted user credential if the keystore is not present but a public key linked to an encrypted user credential of a particular user is known; and the revocation logic is further configured to revoke access of one or more keystores of the particular user based on the user public key notwithstanding absence of the one or more keystores.

11. The system of claim 10, further configured to revoke the access of the keystores by revoking access of user private keys stored on the keystores.

12. The system of claim 10, further configured to cause erasure of encrypted content linked to the keystores.

13. The system of claim 1, wherein:
the revocation logic is configured to revoke access of a user identity of a particular user based on a user identifier of the particular user if the keystore is not present but a user identifier linked to a particular user is known, and in turn cause:
 (i) revocation of access of one or more encrypted user credentials of the particular user,
 (ii) revocation of access of one or more keystores of the particular user, and
 (iii) erasure of encrypted content linked to the keystores.

14. The system of claim 13, wherein the user identifier is an e-mail of the particular user.

15. The system of claim 13, wherein the user identifier is a phone number of the particular user.

16. The system of claim 13, further configured to revoke the access of the keystores by revoking access of user private keys stored on the keystores.

17. The system of claim 1, wherein:
the administrative logic is further configured to revoke access of a device that has been associated with one or more groups, wherein the device is configured to authenticate a plurality of users in a workgroup of the one or more groups, wherein:
 the revocation logic is further configured to write a workgroup public key linked to a device credential of the device to a certificate revocation list, and in turn cause
  (i) revocation of access of a device identity of the device,
  (ii) revocation of access of the device, and
  (iii) revocation of access of the device credential.

18. The system of claim 17, further configured to reissue user credentials of users in the plurality of users.

19. The system of claim 17, further configured to accept an association of a user's own device.

20. The system of claim 19, wherein a group includes at least one of a formal organization, an informal organization, a loose confederation of traders, a single actor associated with one or more contractors, employees, or agents, a set comprised of market competitors, enemies, or frenemies.

21. The system of claim 17, further configured to erase the device credential from the device.

22. The system of claim 1, wherein:
the administrative logic is further configured to revoke access of an administrative device, wherein the administrative device is configured to authenticate a plurality of devices in an organization, wherein:
 the revocation logic is further configured to write an administrative public key linked to an administrative device credential of the administrative device to a certificate revocation list, and in turn cause:
  (i) revocation of access of an administrative device identity of the administrative device,
  (ii) revocation of access of the administrative device, and
  (iii) revocation of access of the administrative device credential.

23. The system of claim 22, further configured to erase the administrative device credential from the administrative device.

24. The system of claim 22, wherein an organization can include at least one of a formal organization, an informal organization, a loose confederation of traders, a single actor associated with one or more contractors, employees, or agents, a set comprised of market competitors, enemies, or frenemies.

25. A method for revoking user access to one of a set of decentralized networked nodes that share a private permissioned blockchain data structure or a decentralized personal ledger, to which access has been limited to users authorized by one of the set of decentralized networked nodes, the method comprising:
 deconfiguring user private keys from keystores of respective users, further comprising:
  receiving a unique identifier linked to a keystore of a particular user;
  revoking access of the keystore based on the unique identifier in response to the keystore or if the keystore is not present but a unique identifier linked to a particular user is known; and
  the revocation logic is further configured to erase encrypted content linked to the keystore based on the unique identifier notwithstanding absence of the keystore.

26. A non-transitory computer readable medium storing instructions for revoking user access to one of a set of decentralized networked nodes that share a private permissioned blockchain data structure or a decentralized personal ledger, to which access has been limited to users authorized by one of the set of decentralized networked nodes, which instructions when executed by one or more processors perform:
 deconfiguring user private keys from keystores of respective users, further comprising:
  receiving a unique identifier linked to a keystore of a particular user;
  revoking access of the keystore based on the unique identifier in response to the keystore or if the keystore is not present but a unique identifier linked to a particular user is known; and
  the revocation logic is further configured to erase encrypted content linked to the keystore based on the unique identifier notwithstanding absence of the keystore.

* * * * *